United States Patent [19]
Launier et al.

[11] Patent Number: 6,025,702
[45] Date of Patent: Feb. 15, 2000

[54] SIGNAL PROCESSING UNIT FOR A TROLLEY POLE SWITCH CONTROLLER

[75] Inventors: Francis A. Launier, Laval, Canada; John H. Corvin, Greer; Charles C. Siegling, III, Greenville, both of S.C.

[73] Assignee: Westinghouse Air Brake Company, Wilmerding, Pa.

[21] Appl. No.: 08/641,439

[22] Filed: May 1, 1996

[51] Int. Cl.[7] ...................................................... G05F 1/40
[52] U.S. Cl. ............................ 323/273; 191/37; 191/38; 246/419; 246/468
[58] Field of Search .................................. 246/418, 419, 246/468, 460, 462, 472, 476; 104/130.01; 323/273; 191/37, 38, 33 R; 455/68; 363/65; 307/75

[56] References Cited

U.S. PATENT DOCUMENTS

| | | | |
|---|---|---|---|
| 2,360,064 | 10/1944 | Lewis ......................................... | 191/38 |
| 2,710,316 | 3/1955 | George ....................................... | 191/38 |
| 4,090,452 | 5/1978 | Segar ......................................... | 104/247 |
| 5,297,661 | 3/1994 | Tschurbanoff ............................. | 191/38 |
| 5,390,772 | 2/1995 | Ta et al. ..................................... | 191/38 |

*Primary Examiner*—Shawn Riley
*Attorney, Agent, or Firm*—James Ray & Associates

[57] ABSTRACT

A signal processing unit for a controller of a trolley pole switch is disclosed. The trolley pole switch switches the path of travel that an energy collector takes through the switch at a junction of catenaries at which a turn catenary and a straight catenary diverge from the straight catenary. The signal processing unit includes an input stage, a detection stage, turn and straight signal demodulation stages and an output stage. The input stage conditions modulated signals, each of which indicating a request to switch the path of travel through the trolley pole switch to the desired catenary diverging therefrom. The detection stage generates a validation signal if the conditioned modulated signal falls within a predetermined band. If the turn demodulation stage receives a conditioned modulated turn signal from the input stage and the validation signal from the detection stage simultaneously, it generates a low logic signal. If the straight demodulation stage receives a conditioned modulated straight signal from the input stage and the validation signal from the detection stage simultaneously, it generates a low logic signal. If a low logic signal is received from the turn demodulation stage, the output stage energizes a turn relay thereby supplying power to a turn solenoid for switching the path of travel to the turn catenary. If a low logic signal is received from the straight demodulation stage, the output stage energizes a straight relay thereby supplying power to a straight solenoid for switching the path of travel to the straight catenary.

24 Claims, 9 Drawing Sheets

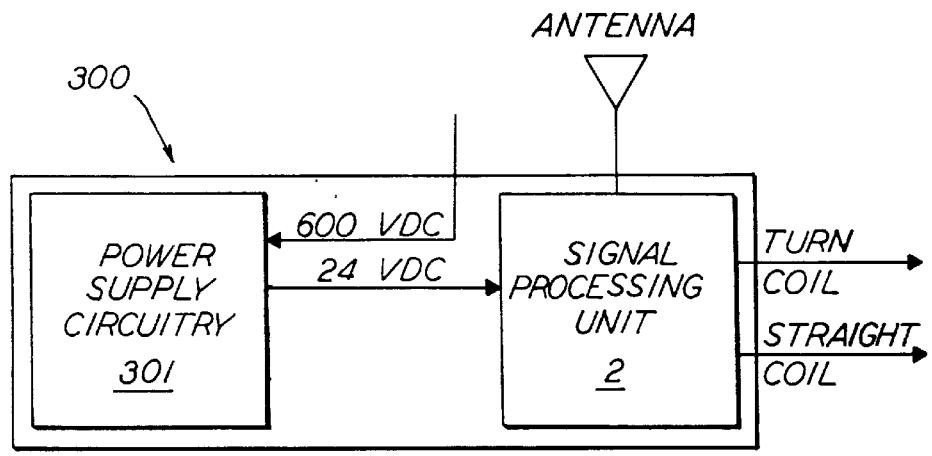
FIG. IA
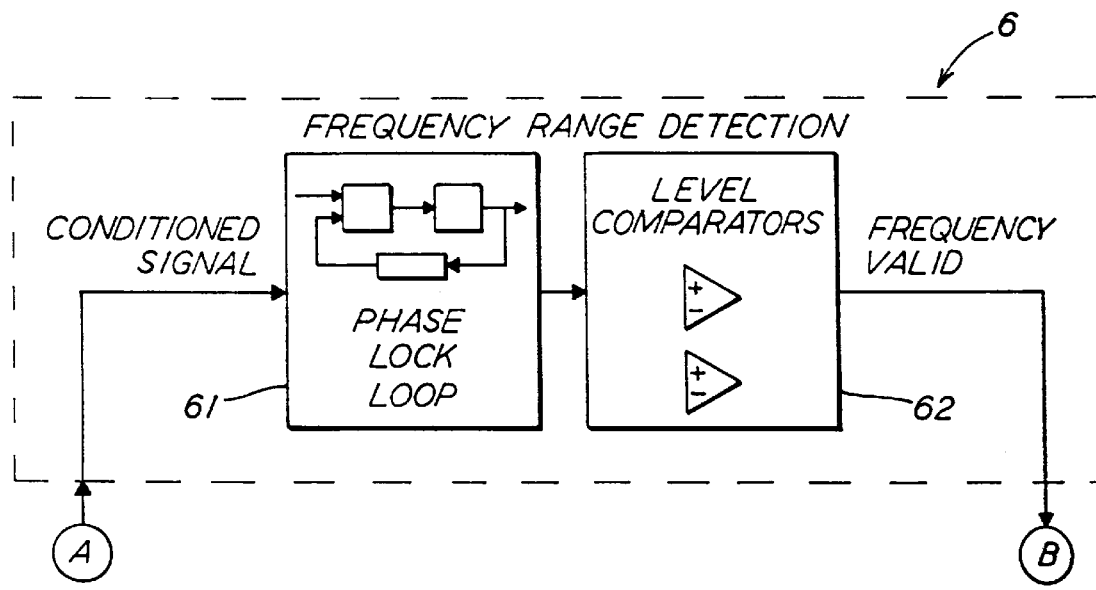
FIG. IC

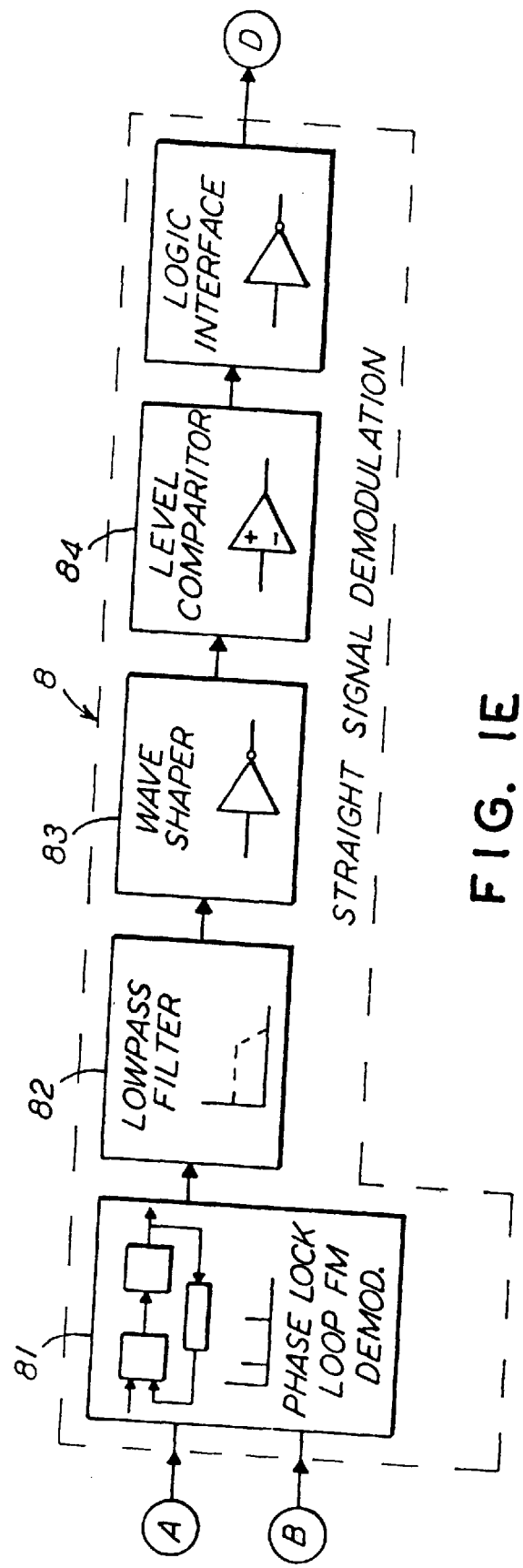

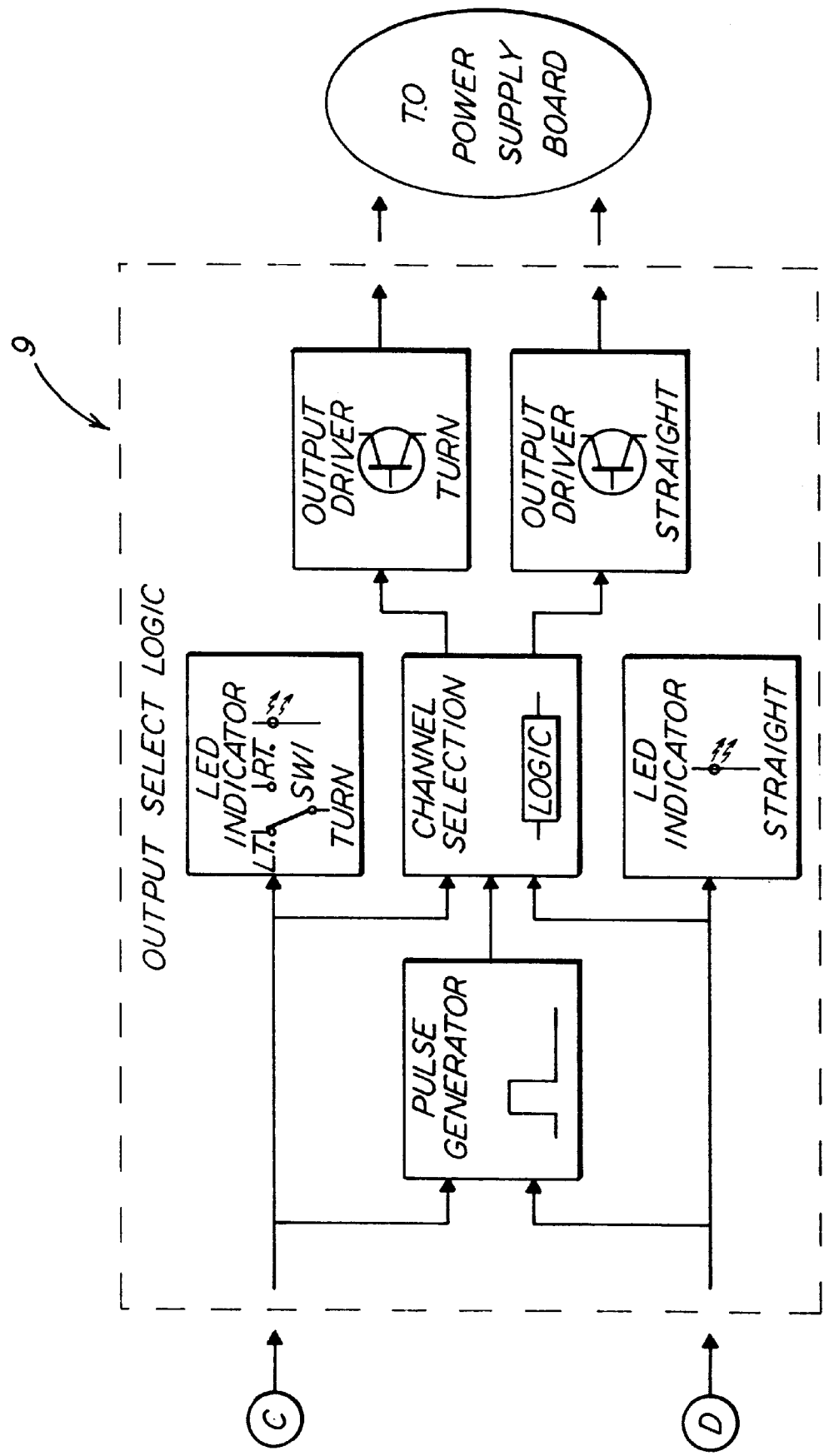
FIG. IF

SIGNAL PROCESSING UNIT FOR A TROLLEY POLE SWITCH CONTROLLER

CROSS-REFERENCE TO RELATED APPLICATIONS

This application is related to copending applications Ser. Nos. 08/641,402 and 08/644,406, entitled Electronic Controller For A Trolley Pole Switch Mechanism and Power Controlling Unit For A Trolley Pole Switch Controller, respectively, both sharing the same filing date of the present application, May 1, 1996, and filed currently herewith. These patent applications are assigned to the assignee of the present invention, and the teachings therein are incorporated into the present application by reference thereto.

FIELD OF THE INVENTION

The present invention generally relates to a trolley pole switch for switching the path of travel of an energy collector assembly of a trolley pole at a junction of diverging power conduits. More particularly, the present invention is concerned with a signal processing unit for a trolley pole switch controller.

BACKGROUND OF THE INVENTION

As is well known in the trolley vehicle art, an electrically powered trolley vehicle receives the energy needed for its operation from an overhead catenary or a similar power conduit. Mounted atop the trolley vehicle is a trolley pole to which is attached at one end an energy collector assembly. The energy collector assembly rides along the power conduit, or "trolley line" as it is often called, as the trolley vehicle travels along its route of travel. The energy is conveyed from the power conduit through the energy collector assembly of the trolley pole and ultimately delivered to a propulsion unit and other energy consuming devices located on the trolley vehicle.

Also well known in the trolley vehicle art is the operation of a trolley pole switch mechanism (hereinafter "trolley pole switch"). A trolley pole switch is a device situated at a junction of diverging power conduits located above the point where the routes of travel of the trolley vehicle diverge in different directions. The trolley pole switch is used to switch the path of travel that the energy collector assembly of the trolley pole takes at a junction of diverging power conduits. A junction of diverging power conduits may consist of one power conduit strung in a straight path and another power conduit diverging therefrom strung in a path heading to a generally left direction. Likewise, such a junction may consist of one power conduit strung in a straight path and another diverging therefrom strung in a path heading to a generally right direction.

As a trolley vehicle approaches a junction, the trolley pole switch may be commanded to switch the path that the energy collector assembly will travel from the power conduit strung in a straight path to either of the power conduits strung in the left or right direction. When the trolley vehicle seeks to proceed through a junction in a straight path, the trolley pole switch, as explained below, may or may not have to be commanded to switch the path to assure that the energy collector proceeds therethrough on the power conduit strung in the straight path. The route of travel of the trolley vehicle, of course, always corresponds to the path of travel that the energy collector assembly follows through trolley pole switch and thereafter on the power conduit to which it is directed.

The typical trolley pole switch has two switching elements, or "frogs" as they are often called. A frog of the type that is controllable by the instant invention is described in U.S. Pat. No. 5,390,772 to Ta et al., incorporated herein by reference. Each frog, as described in Ta et al., of the typical trolley pole switch, contains an electrical operator such as a solenoid. When the solenoid of one frog is energized, it acts upon certain elements within that frog to switch the path that the energy collector assembly will travel through that frog from the straight power conduit to one power conduit diverging from the straight power conduit. Likewise, when the solenoid of the other frog is energized, it acts to switch the path that the energy collector assembly will travel through that frog from the straight power conduit to another power conduit diverging from the straight power conduit. Still referring to the one-solenoid frog described in U.S. Pat. No. 5,390,772, as the energy collector assembly rides through that frog, it engages a deflector arm which mechanically resets the frog to permit travel therethrough in a straight path. Consequently, the next trolley vehicle that wishes to proceed through that frog on the straight power conduit may do so without the need for any switching of the path.

Various other frogs are configured so that, when the solenoid is energized, the energy collector assembly will travel straight through that frog on the straight power conduit. The energy collector assembly, as it rides through this type of frog, then engages the deflector arm which mechanically resets the frog to permit travel therethrough from the straight power conduit to a left or right diverging power conduit. The next trolley vehicle that wishes to proceed through the frog on the straight power conduit must then energize the solenoid to switch the path.

Certain other types of frogs, however, do not reset mechanically and must be reset via a separate solenoid. These types of frogs thus contain two solenoids. When one solenoid of the two-solenoid frog is energized, it acts to switch the path that the energy collector assembly will travel from the straight power conduit to one of the power conduits diverging therefrom. When the other solenoid of the two-solenoid frog is energized, it acts to switch the path that the energy collector assembly will travel back to the straight power conduit. Consequently, the next trolley vehicle that wishes to proceed through the two-solenoid frog may be required to switch the path so as to assure it will proceed in the direction it intends. The instant invention is capable of controlling the operation of a trolley pole switch no matter which of the aforementioned types of frog(s) is utilized at a given junction of diverging power conduits.

The trolley pole switch alters the path of travel that the energy collector assembly takes therethrough in response to commands received from a controller unit. As described in greater detail in the ensuing paragraphs, the controller unit controls the operation of the trolley pole switch by energizing the frog solenoids. Located in proximity to the trolley pole switch, the controller unit receives signals from a transmitter disposed on a trolley vehicle. The transmitted signals are indicative of a request for the energy collector assembly to proceed through the trolley pole switch in a straight path or veer through it onto either a right path or a left path. The transmitted signals are frequency modulated having resting frequencies centered at 9.2 kHz for a left turn, 11.5 kHz to proceed straight, and 14.0 kHz for a right turn. As a trolley vehicle approaches a junction of diverging power conduits, an operator aboard the trolley vehicle chooses the route of travel that the trolley vehicle is to take at the upcoming junction. The route of travel is chosen via levers or like implements, located in a cab of the trolley vehicle, through which the left, the right or the straight path through the junction may be selected. When a particular route of travel is chosen and its corresponding implement manipulated, the transmitter on the trolley vehicle transmits the appropriate signal to the controller unit. The controller unit receives the signal and generates in response thereto a signal to energize the appropriate solenoid on the trolley pole switch situated at the upcoming junction. The solenoid then acts upon certain elements of the frog to switch the path that the energy collector assembly will take through the trolley pole switch. The trolley vehicle then proceeds through the junction on its chosen route of travel.

Trolley pole switch controller units have been in widespread use in the transit industry for several years prior to the present invention. The typical controller unit includes a radio control board and usually a power supply board. The radio control board includes circuitry for receiving and processing the incoming modulated signals so as to generate intermediate command signals each of which indicative of a command to supply power to an appropriate frog solenoid. The power supply board includes power circuitry for stepping down voltage so as to supply the radio control board with power as well as to supply power to the frog solenoids. In response to each of the three command signals received from the radio control board, the current is switched by an appropriate transistor so that trolley line voltage passes from the power conduit to energize the appropriate solenoid. The solenoid then compels the certain frog elements to switch the path that the energy collector assembly will take through the trolley pole switch.

For those certain prior art controller units that do not include a power supply board, the controller unit includes only the radio board and accompanying power supply circuitry for stepping down voltage so as to supply the radio control board with power. The radio control board still includes circuitry for receiving and processing the incoming modulated signals so as to generate the intermediate command signals. The intermediate command signals, though, are used to drive separate high voltage capacity mechanical relays directly. These relays when actuated directly pass the high voltage of the trolley line to energize the appropriate solenoid of the intended frog. The solenoid then compels the certain frog elements to switch the path that the energy collector assembly will take through the trolley pole switch.

The prior art controller unit contains old technology and therefore exhibits the disadvantages inherent to that technology. Experience has shown that the prior art controller unit oftentimes inadvertently energizes the frog solenoids intermittently in response to spurious noise arising from other radio sources. For example, the radio control boards have proven too sensitive to the transmitted signals emanating from other nearby trolley vehicle transmitters and/or too susceptible to the harmonics of those transmitted signals. Such "false tripping" as it is called, if it occurs while a trolley vehicle is passing through a junction, can cause the energy collector assembly to separate or "dewire" from the overhead power conduit. Dewiring at even low speeds can cause a significant amount of damage to the trolley pole switch, the affected energy collector assembly and the overhead catenary on which it rides.

Experience has shown that the power supply board of the prior art controller unit also has its shortcomings. The power supply board serves in part to step down the 450–770 dc voltage present on the power conduit to the 24 dc volt level required for operation of the radio control board. Because the circuitry on the prior art power supply board dissipates approximately 60 watts of heat in stepping down the voltage, the enclosure in which the prior art controller unit is housed requires vents. Though some heat is carried away by air flowing through the vents, moisture suspended in the air tends to condense on the circuitry. The heat and moisture have been shown to promote oxidation of componentry on the controller unit and affect adversely its operation.

Referring again to those certain prior art controller units that include only a radio control board and the accompanying power supply circuitry, experience has shown that the circuitry on those radio boards and the power supply circuitry are oftentimes damaged by surge voltages arising on the trolley line. These surge voltages are passed to the prior art radio control board via the high voltage capacity mechanical relays to which the prior art radio board directly connects.

The radio control boards of the prior art controller units have also proven quite vulnerable to cold temperatures. Heating elements or insulation have been used to assure proper operation in cold weather climates. Other disadvantages relate to the reliability, the size, and the cost of the mechanical elements used in the prior art controller unit.

In a presently preferred embodiment, the present invention is intended primarily as a replacement for the prior art radio board contained within those certain prior art controller units that include only a radio control board and the accompanying power supply circuitry. In a second embodiment, the present invention may be also be used as a replacement for the signal processing unit described and claimed in the aforementioned application entitled Electronic Controller For A Trolley Pole Switch Mechanism.

The present invention constitutes an advance over prior art radio boards in several respects. First, the instant invention more accurately and selectively discriminates the modulated signals received from the trolley vehicle transmitters from the unwanted noise. This eliminates false tripping of the frog solenoids caused by prior art radio boards picking up signals from sources other than the intended trolley vehicle. Second, the instant invention also features a fine tuning adjustment that permits a technician to set the receiving range and sensitivity of the device to accommodate variations in field conditions. Third, the instant invention more reliably controls the power received from the power supply circuitry remaining on the prior art controller unit so as to supply the present invention with a protected and regulated source of power to operate same. Fourth, the instant invention operates dependably over a wide range of temperatures without need of heating elements or thermal insulation. These and other advantages favor the present invention over prior art radio boards in terms of cost, space and reliability.

It should be noted that the foregoing background information is provided to assist the reader in understanding the instant invention and any terms of art used herein are not intended to be limited to any specific meaning unless specifically stated otherwise in this specification including the following detailed description.

OBJECTIVES OF THE INVENTION

It is, therefore, a primary objective of the present invention to provide a signal processing unit for a trolley pole switch controller unit.

Another objective of the present invention is to provide a signal processing unit for a trolley pole switch controller unit that accurately and selectively discriminates valid input signals from spurious noise arising from other radio sources thereby substantially reducing the likelihood of false tripping of the trolley pole switch solenoids and of the concomitant damage possible as a result thereof.

Still another objective of the present invention is to provide a signal processing unit for a trolley pole switch controller unit that includes a fine tuning adjustment that permits a technician to adjust the gain and sensitivity of the signal processing unit to accommodate variations in the environment in which the frog controller unit operates.

Even another objective of the present invention is to provide a signal processing unit for a trolley pole switch controller unit that includes phase lock demodulators, signal strength detection circuitry and modulation error detection circuitry so that the controller unit reliably and accurately recognizes valid input signals.

A further objective of the present invention is to provide a signal processing unit for a trolley pole switch controller unit that includes time out circuitry for automatically deenergizing the trolley pole switch solenoid after a preset amount of time if the signal processing unit continuously receives a valid input signal.

Yet a further objective of the present invention is to provide a signal processing unit for a trolley pole switch controller unit capable of operating within various environments wherein the temperature can range from –40° to 70° Celsius.

Still a further objective of the present invention is to provide a signal processing unit for a trolley pole switch controller unit that is more reliable, less expensive, and occupies less space than prior art radio boards of prior art frog controller units.

Even a further objective of the present invention is to provide a signal processing unit for a trolley pole switch controller unit that is implemented primarily through semiconductor technology rather than through traditional mechanical componentry.

An additional objective of the present invention is to provide a signal processing unit that is compatible with prior art power supply circuitry and can therefore be substituted for a prior art radio board of a prior art frog controller unit.

Still another objective of the present invention is to provide a signal processing unit for generating a pulse used ultimately to energize the appropriate frog solenoid of the trolley pole switch wherein the duration of the pulse is adjustable so that in colder climates which cause trolley pole switches to operate more slowly the pulse is of sufficient length to assure that the trolley pole switch completely switches to the appropriate setting and in warmer climates which cause trolley pole switches to operate more quickly the pulse is of sufficient brevity to assure that the frog solenoids will not overheat and become damaged.

In addition to the objectives and advantages of the signal processing unit invention set forth above, various other objectives and advantages will become more readily apparent to persons skilled in the trolley vehicle art from the detailed description of the invention, particularly when considered in conjunction with the attached drawings and with the appended claims.

SUMMARY OF THE INVENTION

In one preferred embodiment, the present invention provides a signal processing unit for a controller of a trolley pole switch. The trolley pole switch has at least one frog for switching the path of travel therethrough of an energy collector assembly of a trolley pole at a junction of power conduits at which a turn power conduit and a straight power conduit diverge from the straight power conduit. The signal processing unit includes an input means, a frequency detection means, turn and straight signal demodulation means and an output means. The input means filters, amplifies and conditions each of a plurality of modulated signals. Each modulated signal represents a request to switch the path of travel that the energy collector takes through the trolley pole switch to a desired one of the power conduits diverging therefrom. In response to each such modulated signal, the input stage generates a conditioned modulated signal. The conditioned modulated signal is a conditioned modulated turn signal when generated in response to a modulated signal representing a request to switch the path of travel to the turn power conduit. The conditioned modulated signal is a conditioned modulated straight signal when generated in response to a modulated signal representing a request to switch the path of travel to the straight power conduit. The frequency detection means detects whether the conditioned modulated signal received from the input means falls within a predetermined band of frequencies. If so, it generates a validation signal indicative of same. If the turn signal demodulation means receives a conditioned modulated turn signal from the input means and a validation signal from the frequency detection means simultaneously, the turn signal demodulation means demodulates the conditioned modulated turn signal and generates in response thereto a low logic signal. If the straight signal demodulation means receives a conditioned modulated straight signal from the input means and a validation signal from the frequency detection means simultaneously, the straight signal demodulation means demodulates the conditioned modulated straight signal and generates in response thereto a low logic signal. If a low logic signal is received from the turn signal demodulation means, the output means energizes a turn relay thereby supplying power to a turn solenoid for switching the path of travel to the turn power conduit. If a low logic signal is received from the straight signal demodulation means, the output means energizes a straight relay thereby supplying power to a straight solenoid for switching the path of travel to the straight power conduit.

BRIEF DESCRIPTION OF THE DRAWINGS

FIG. 1A is a block diagram showing a signal processing unit, according to the present invention, coupled with the power supply circuitry of a prior art trolley pole switch controller unit.

FIG. 1C is a block diagram of a frequency detection stage of the signal processing unit shown in FIG. 1A.

FIG. 1E is a block diagram of a straight signal demodulation stage of the signal processing unit shown in FIG. 1A.

FIG. 1F is a block diagram of an output stage of the signal processing unit shown in FIG. 1A.

DETAILED DESCRIPTION OF THE INVENTION

Figure 1B:
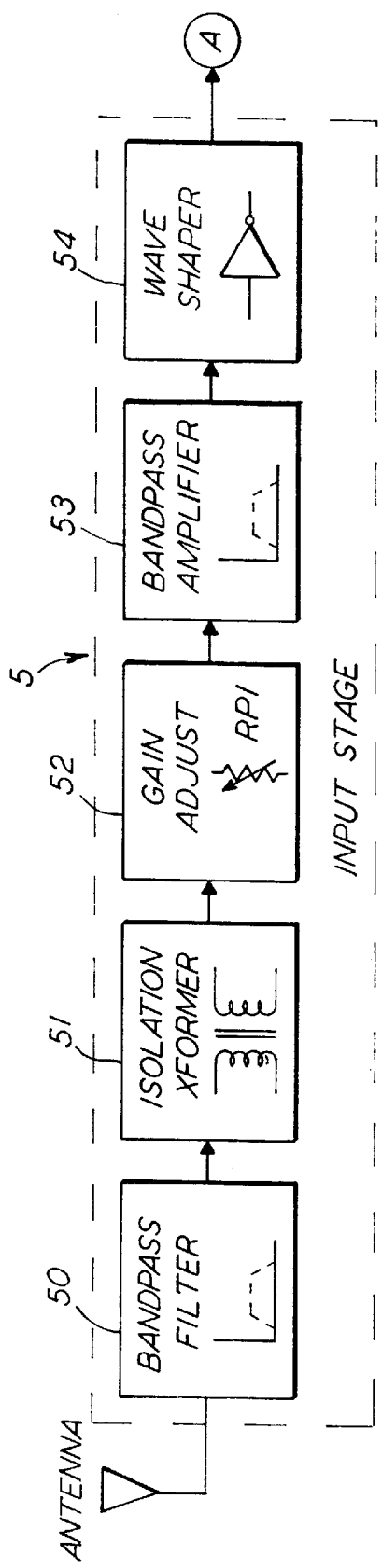
FIG. 1B is a block diagram of an input stage of the signal processing unit shown in of FIG. 1A.

Before describing the present invention in detail, for the sake of clarity and understanding, the reader is advised that identical components having identical functions in each of the accompanying drawings have been marked with the same reference numerals throughout each of the several Figures illustrated herein.

In the presently preferred embodiment of the instant invention illustrated in FIG. 1A a signal processing unit 2 of the instant invention incorporates within a prior art controller unit 300 as a replacement for the prior art radio board formerly contained within the prior art controller unit 300. Supplied with power by power supply circuitry 301 contained within the prior art controller unit 300, the signal processing unit 2 directly controls high voltage mechanical relays (not shown) for switching power to the frog solenoids of a trolley pole switch.

The signal processing unit 2 receives frequency modulated signals, through an antenna, from a transmitter situated on a trolley vehicle. As alluded to previously, the transmitter may transmit any one of three frequency modulated signals. A frequency modulated straight signal indicates a request to switch the path of travel through a frog so that an energy collector assembly rides straight therethrough on a power conduit strung in a straight path. A frequency modulated left turn signal indicates a request to switch the path of travel so that an energy collector assembly rides from the straight power conduit to one strung to a left direction. Likewise, a frequency modulated right turn signal indicates a request to switch the path of travel so that an energy collector assembly rides from the straight power conduit to one strung to a right direction.

The frequency of each modulated signal lies within a band of frequencies predetermined by the circuit design of the transmitter. This predetermined band extends approximately from 8.8 kHz to 14.9 kHz. Specifically, the frequency modulated left turn signal has its resting frequency centered at 9.2 kHz which varies between a preset range of 8.8 kHz to 9.5 kHz by virtue of the left turn modulation signal it carries. The frequency modulated straight signal has its resting frequency centered at 11.5 kHz which varies between a preset range of 11.1 kHz to 11.95 kHz by virtue of the straight modulation signal it carries. Likewise, the frequency modulated right turn signal has its resting frequency centered at 14 kHz which varies between a preset range of 13.4 kHz to 14.6 kHz by virtue of the right turn modulation signal it carries. These are the modulated signals, whose frequencies lie within the predetermined band, that the signal processing means 2 must detect and process.

The signal processing unit 2 processes the frequency modulated signals through several stages to generate ultimately intermediate commands signals to energize the high voltage mechanical relays through which power is switched to the frog solenoids of the various trolley pole switches. Specifically, the signal processing unit 2 generates an intermediate straight command signal in response to the frequency modulated straight signal. Through the intermediate straight command signal, the straight high voltage relay energizes thereby supplying power to a straight frog solenoid. When energized, the straight solenoid acts upon certain elements within that frog to switch the path of travel that the energy collector assembly will take through the frog to the straight power conduit. The signal processing unit 2 likewise generates an intermediate turn command signal in response to the frequency modulated turn signal. Through the intermediate turn command signal, the turn high voltage relay energizes thereby supplying power to a turn frog solenoid. When energized, the turn solenoid acts upon certain elements within that frog to switch the path of travel that the energy collector assembly will take through the frog to the turn power conduit.

Referring now to FIGS. 1A–F and 2A–F, the signal processing unit 2 includes a voltage conversion stage 4, a signal input stage 5, a frequency detection stage 6, a turn signal demodulation stage 7, a straight signal demodulation stage 8 and an output stage 9.

Figure 2A:
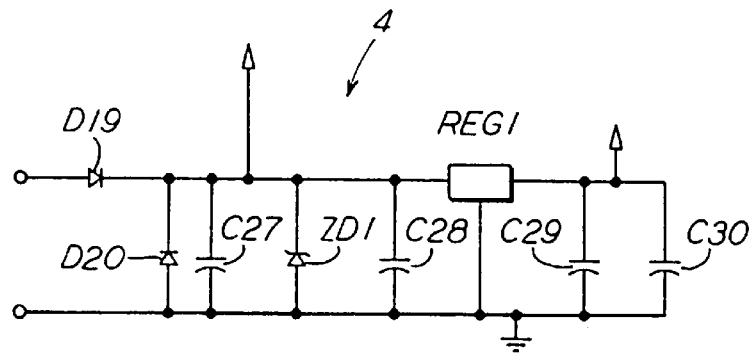
FIG. 2A is a schematic of a voltage conversion stage of the signal processing unit according to the present invention.

The voltage conversion stage 4 receives from the prior art power supply circuitry 301 an input voltage of 24 volts dc as shown in FIG. 2A. The voltage conversion stage 4 reduces the 24 volts dc input to 15 volts dc and regulates same. Each of the other stages of the signal processing unit 2 uses the 15 volts dc internally to power its operations.

Figure 2C:
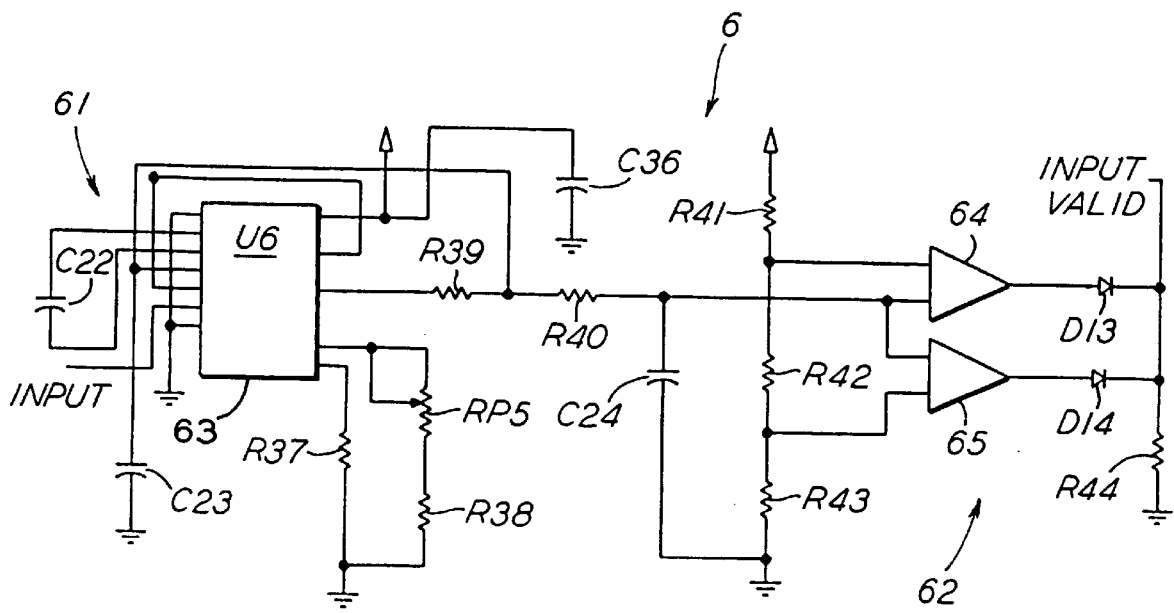
FIG. 2C is a schematic of a frequency detection stage of the signal processing unit according to the present invention.
Figure 2B:
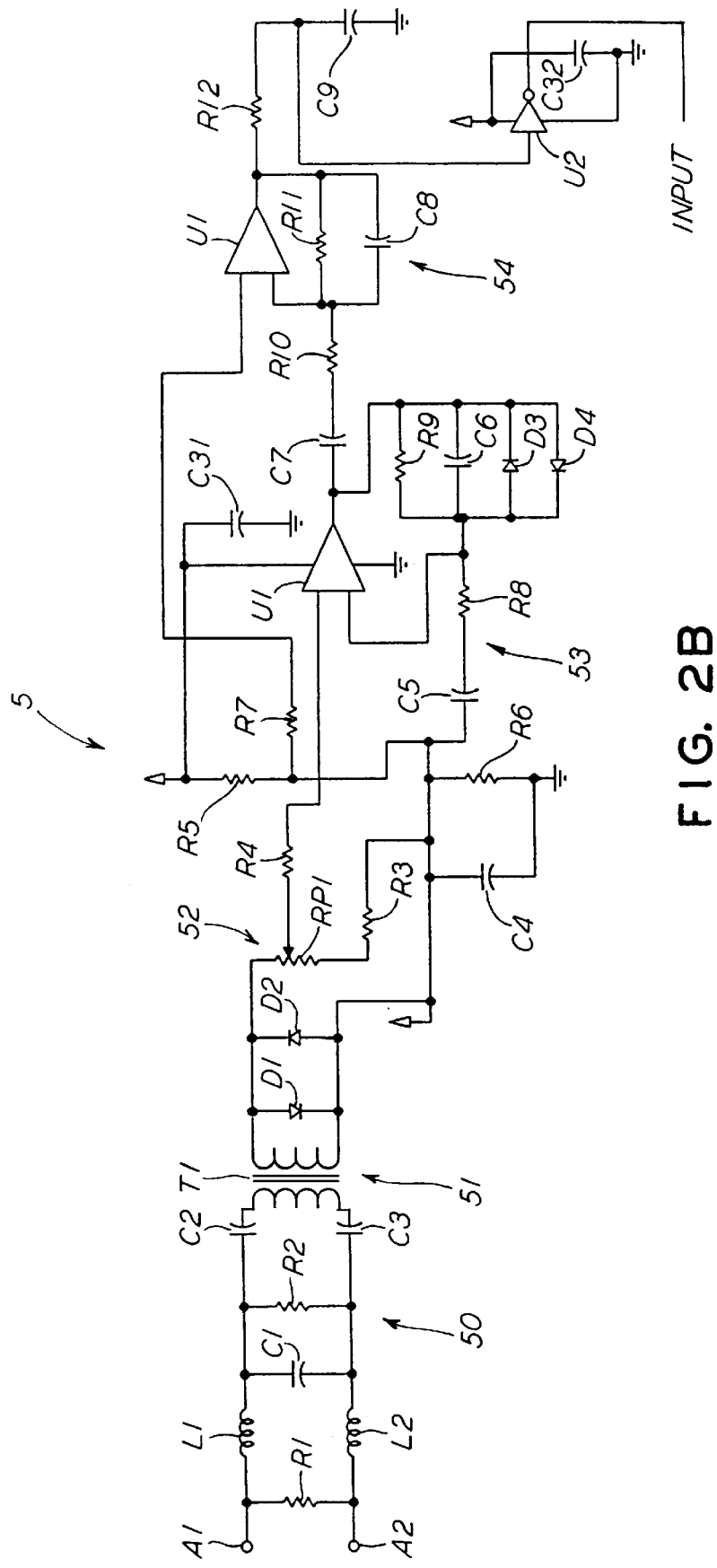
FIG. 2B is a schematic of a signal input stage of the signal processing unit according to the present invention.

As illustrated in FIGS. 1B and 2B, the signal input stage 5 filters, amplifies and shapes each modulated signal received from the antenna and outputs a conditioned modulated signal in response. For the sake of clarity, the signal input stage 5 generates a conditioned modulated straight signal in response to the frequency modulated straight signal. Likewise, the signal input stage 5 generates conditioned modulated left and conditioned modulated right turn signals, respectively, in response to the modulated left and modulated right turn signals received from the antenna.

The signal input stage 5 includes a bandpass filter circuit 50, an isolation circuit 51, a gain adjusting circuit 52, a bandpass amplifier circuit 53, and a first signal shaping circuit 54. The bandpass filter circuit 50 filters each of the inputted frequency modulated signals received from the antenna so that frequencies outside the predetermined band are substantially attenuated and frequencies within the predetermined band are allowed to pass therethrough. A filtered modulated signal emerges from the bandpass filter circuit 50 for each of the frequency modulated signals received at the signal input stage 5. The predetermined band of frequencies allowed to pass through the bandpass filter circuit 50 ranges approximately from 8.8 kHz to 14.9 kHz. The filtered modulated signal that emerges from the bandpass filter circuit 50 then passes through the isolation circuit 51. The isolation circuit 51 serves to isolate the electronic circuitry contained within the signal processing unit 2 from undesirable electrical influences arising from other electrical circuitry and the high voltage trolley line. The filtered modulated signal then flows through the gain adjusting circuit 52.

The gain adjusting circuit 52 allows the sensitivity of the signal input stage 5 to be adjusted. Specifically, the gain adjusting circuit 52 includes a variable resistor RP1 as shown in FIGS. 1B and 2B. Subsequent to the manufacture of the signal processing unit 2, a plant technician may use RP1 to calibrate the signal input stage 5, and thus the signal processing unit 2, to best respond to the modulated signals transmitted from the trolley vehicle. The initial calibration of the signal input stage 5, however, is usually performed under the nearly ideal test conditions of the manufacturing plant. Nevertheless, the signal processing unit 2 is preferably made so that RP1 is accessible to technicians in the field. Through adjustment of RP1, a field technician may finely tune the signal input stage 5 to accommodate variations in the strength of the transmitted signals typically encountered under field conditions.

The bandpass amplifier circuit 53 amplifies the filtered modulated signal received from the gain adjuster circuit 52 so that frequencies within the predetermined band are allowed to pass therethrough with substantially uniform response. An amplified modulated signal emerges from the bandpass amplifier circuit 53 for each of the filtered modulated signals received from the gain adjusting circuit 52. Like the bandpass filter circuit 50, the predetermined band of frequencies passable through the bandpass amplifier circuit 53 ranges approximately from 8.8 kHz to 14.9 kHz.

The amplified modulated signal then passes into the first signal shaping circuit 54 of the signal input stage 5. The first signal shaping circuit 54 improves the condition of the amplified modulated signal so that its amplitude is consistent and its wave edges exhibit smooth, steep transitions. It also provides a degree of filtering. The first signal shaping circuit 54 thus provides the requisite conditioning of the amplified modulated signal prior to passing it, as the conditioned modulated signal, to each of the frequency detection 6, turn signal demodulation 7, straight signal demodulation 8 stages of the signal processing unit 2.

Referring now to FIGS. 1C and 2C, the frequency detection stage 6 of the signal processing unit 2 detects whether the frequency of the conditioned modulated signal received from the signal input stage 5 falls within the predetermined band of frequencies. If so, the frequency detection stage 6 generates a validation signal in response. The validation signal indicates that the conditioned modulated signal, and thus the modulated signal received from the antenna, is one which either the turn signal or straight signal demodulation stages 7,8 can demodulate. The validation signal in essence serves to enable either of the turn and straight signal demodulation stages 7,8 to operate in response to the conditioned modulated turn and straight signals, respectively.

The frequency detection stage 6 includes a first phase lock loop circuit 61 and a first level comparator circuit 62 as shown in FIGS. 1C and 2C. The first phase lock loop circuit 61 includes a PLL chip or like circuitry 63 and a variable resistor RP5. Variable resistor RP5 allows adjustment of the predetermined band of frequencies detectable by the first phase lock loop circuit 61. The first level comparator circuit 62 includes two comparators 64 and 65, a resistor R40, a capacitor C24 and resistors R41 through R43.

The first phase lock loop circuit 61 receives its input from the first signal shaping circuit 54 of the signal input stage 5. Assuming, of course, that the input is of sufficient strength, the first phase lock loop circuit 61 will lock onto the incoming conditioned modulated signal if its frequency lies within the predetermined band of frequencies. Setup as a frequency to voltage converter, the output of first phase lock loop circuit 61 is a square wave whose frequency is that of the conditioned modulated signal and whose amplitude at any given time is representative of the instantaneous frequency of the conditioned modulated signal. Prior to passage of the square wave signal into the first level comparator circuit 62, resistor R40 and capacitor C24 serve as a filter to suppress rippling without affecting the dc component of the signal. Forming the time constant of a resistance-capacitance circuit, the values of R40 and C24 also determine how long the input signal must be present at the input of the first phase lock loop circuit 61 for the resulting square wave signal to be recognized by the first level comparator circuit 62. If the conditioned modulated signal is present at that input for a sufficient amount of time, the first phase lock loop circuit 61 will produce a square wave carrying enough energy to charge up capacitor C24 so that the first level comparator circuit 62 can analyze the amplitude of square wave signal.

The first level comparator circuit 62 receives the square wave signal from the first phased lock loop circuit 61. Resistors R41 and R43 are selected so that the first level comparator circuit 62 will generate a validation signal, i.e., a logical high signal, if the amplitude of the square wave represents a frequency whose value lies between the upper and lower frequencies or limits of the predetermined band. If the amplitude of the square wave represents a frequency whose value lies outside the predetermined band, then the first level comparator circuit 62 supplies no output signal.

Resistors R41 and R43 thus set the upper and lower voltage thresholds, respectively, for the first level comparator circuit 62 while resistor R42 sets the midpoint between the thresholds. Specifically, resistor R41 is selected so that comparator 64 recognizes the square wave when its amplitude represents a frequency lower than the upper limit of the predetermined band. Likewise, resistor R43 is selected so that comparator 65 recognizes the square wave when its amplitude represents a frequency higher than the lower limit of the predetermined band. When the amplitude of the square wave falls within the upper and lower voltage thresholds of the first level comparator circuit 62, the first level comparator circuit 62 supplies the validation signal to both of the turn signal and straight signal demodulation stages 7 and 8.

It should be apparent that the first phase lock loop circuit 61 will not be able to lock onto the incoming conditioned modulated input signal if its frequency lies outside of the predetermined band of frequencies. Without a valid incoming conditioned modulated signal to process, the frequency detection stage 6 will not generate a validation signal and neither the turn signal nor straight signal demodulation stages 7 and 8 will be enabled to operate. The frequency detection stage 6 merely determines whether the frequency of the incoming signal lies within the predetermined band. The frequency detection stage 6 neither distinguishes whether the incoming modulated signal represents a straight, left turn or right turn request nor demodulates same.

Each signal processing unit 2 includes both a turn signal demodulation stage 7 and a straight signal demodulation stage 8. As alluded to earlier, the turn signal demodulation stage 7 envisioned herein is designed to demodulate either a modulated left turn signal or a modulated right turn signal. Given the teaching herein, however, one skilled in the relevant art could construct one capable of demodulating both turn signals. Such a construction is, therefore, within the scope of the instant invention. Notwithstanding such a construction, the signal processing unit 2 envisioned herein is preferably set to process either straight and left turn requests or straight and right turn requests.

Whichever pair of requests that a given signal processing unit is to be set to process, the phase lock loop circuitry of the demodulation stages must each be preset to detect the proper range of frequencies. The preset frequency ranges must, of course, match those used by the transmitters aboard the trolley vehicles. For a signal processing unit set to process left turn and straight requests, the preset ranges of frequencies for the turn signal demodulation stage and the straight signal demodulation stage lie within 8.8 kHz to 9.5 kHz and 11.1 kHz to 11.95 kHz, respectively. Similarly, for a signal processing unit set to process straight and right turn requests, the preset ranges of frequencies for the straight signal demodulation stage and the turn signal demodulation stage lie within 11.1 kHz to 11.95 kHz and 13.4 kHz to 14.6 kHz, respectively. Each demodulation stage is thus tuned to capture a different narrow preset range of frequencies and this ensures that one demodulation stage will not respond to a modulated signal intended for the other demodulation stage.

Referring to FIGS. 1D–E and 2D–E, the turn and straight signal demodulation stages 7 and 8 each include phase lock loop circuitry, filter circuitry, signal shaping circuitry and level comparator circuitry. Consider first, however, the turn signal demodulation stage 7 illustrated in FIGS. 1D and 2D. Specifically, the turn signal demodulation stage 7 includes a switch SW1, a second phase lock loop circuit 71, a second low pass filter circuit 72, a second signal shaping circuit 73, and a second level comparator circuit 74.

A given signal processing unit is set through SW1 of the turn signal demodulation stage 7 to recognize either straight and right modulated signals or straight and left modulated signals. Primarily affecting the second phase lock loop circuit 71, when switch SW1 is switched left as indicated, the turn signal demodulation stage 7 is tuned so that it will respond only to a conditioned modulated left turn signal. When switch SW1 is switched right, the turn signal demodulation stage 7 is tuned so that it will respond only to a conditioned modulated right turn signal. The straight signal demodulation stage 8, as explained subsequently, is tuned so that it will respond only to a conditioned modulated straight signal.

Figure 1D:
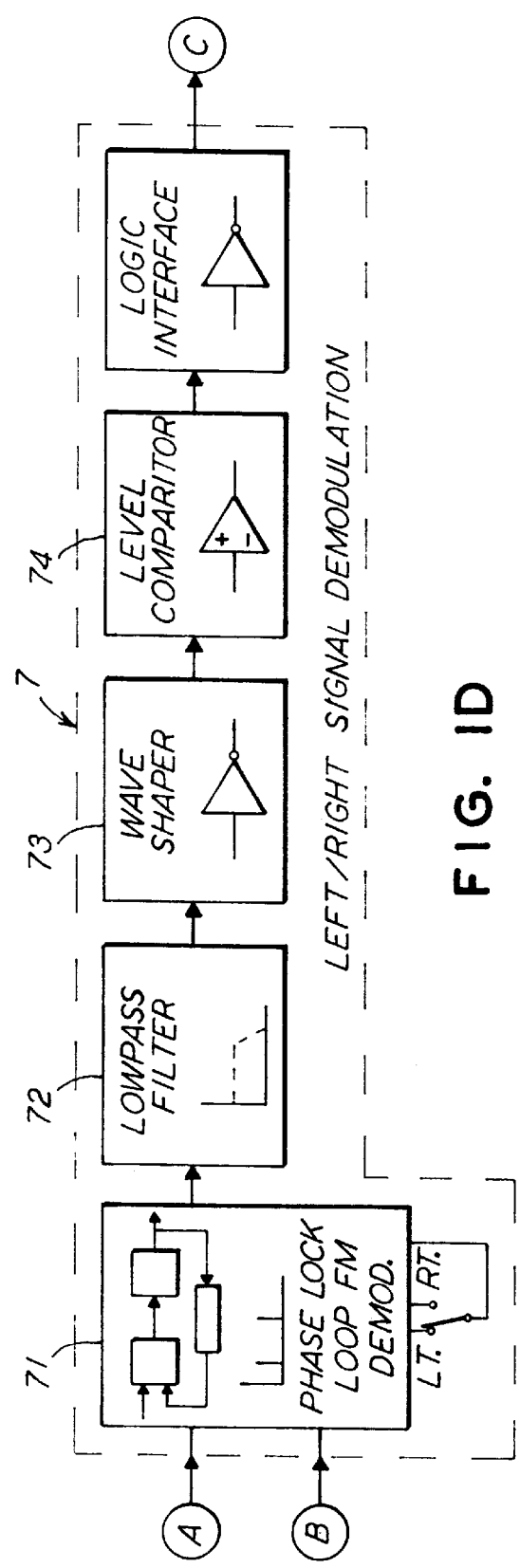
FIG. 1D is a block diagram of a turn signal demodulation stage of the signal processing unit shown in FIG. 1A.
Figure 2D:
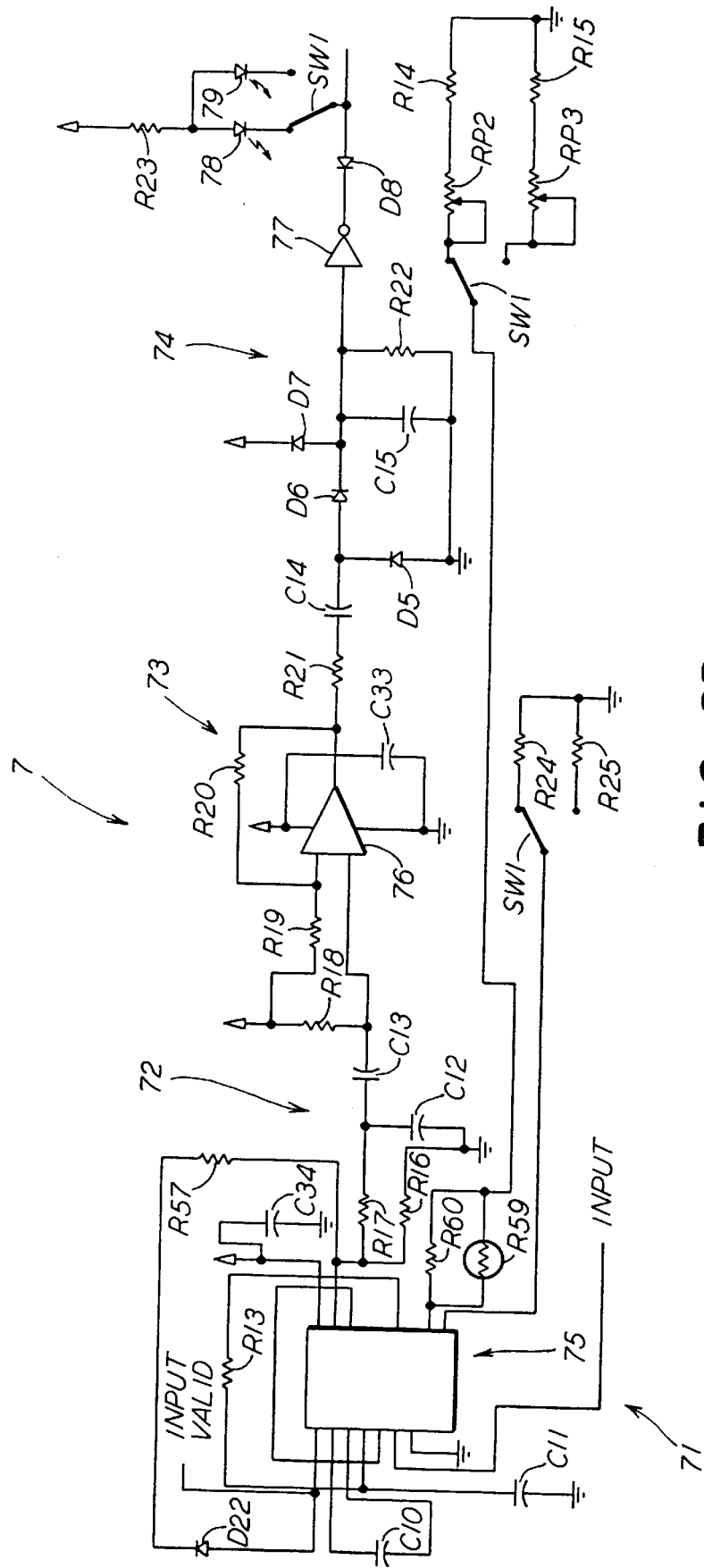
FIG. 2D is a schematic of a turn signal demodulation stage of the signal processing unit according to the present invention.

Setup as a demodulator, the second phase lock loop circuit 71 includes switch SW1, a PLL chip or like circuitry 75, and variable resistors RP2 and RP3. If switch SW1 is set in the left position as shown in FIGS. 1D and 2D, signal processing unit 2 will detect a conditioned modulated left turn signal whose frequency may vary up to approximately 300 Hz above or below a resting frequency of 9.2 kHz depending upon the left turn modulation signal carried thereby. Through variable resistor RP2, the center frequency detectable by the second phase lock loop circuit 71 may be adjusted to account for variations in the environment in which the signal processing unit is used. Conversely, if switch SW1 is set in the right position, signal processing unit 2 will detect a conditioned modulated right turn signal whose frequency may vary up to approximately 600 Hz above or below a resting frequency of 14 kHz depending upon the right turn modulation signal carried thereby. As with variable resistor RP2, variable resistor RP3 allows a field technician to adjust the center frequency detectable by the second phase lock loop circuit 71 to accommodate the particular environmental conditions encountered in the field.

Regarding the operation of the second phase lock loop circuit 71, refer to FIG. 2D. Whether the turn signal demodulation stage 7 is set to process left or right turn requests, the second phase lock loop circuit 71 receives both the conditioned modulated turn signal from the signal input stage 5 and the validation signal from the frequency detection stage 6. In response to these inputs, the second phase lock loop circuit 71 outputs a square wave signal whose frequency is that of the turn modulation signal carried by the conditioned modulated turn signal and whose amplitude represents variations of the turn modulation signal. The second phase lock loop circuit 71 will not capture the turn modulation signal carried by the conditioned modulated turn signal if the frequency of the turn modulation signal is too high. Specifically, for a turn signal demodulation stage set to process left turn requests, a left turn modulation signal exceeding approximately 300 Hz will not be captured. This corresponds to the preset range of frequencies for a conditioned modulated left turn signal of 8.8 kHz to 9.5 kHz. Likewise, for a turn signal demodulation stage set to process right turn requests, a right turn modulation signal exceeding approximately 600 Hz will not be captured. This corresponds to the preset range of frequencies for a conditioned modulated right turn signal of 13.4 kHz to 14.6 kHz.

Accompanying the conditioned modulated turn signal from the signal input stage 5, however, is a certain amount of spurious noise. The square wave that emerges from the second phase lock loop circuit 71 thus passes through the second low pass filter circuit 72. Represented primarily by resistor R17 and capacitor C12, the second low pass filter circuit 72 removes unwanted noise from the square wave signal such that frequencies above a preselected frequency are substantially attenuated and frequencies below the preselected frequency are allowed to pass therethrough. The preselected frequency corresponds to the preset range of frequencies for each of the turn modulation signals. Specifically, for a turn signal demodulation stage set to process left turn requests, the second low pass filter circuit filters unwanted frequencies above approximately 300 Hz. Likewise, for a turn signal demodulation stage set to process right turn requests, the second low pass filter circuit filters unwanted frequencies above approximately 600 Hz.

The filtered square wave signal then passes into the second signal shaping circuit 73 of the turn signal demodulation stage 7. As illustrated in FIG. 2D, the second signal shaping circuit 73 includes capacitors C13 and C14, op amp 76 and resistors R18 through R21. The second signal shaping circuit 73 improves the condition of the filtered square wave signal so that its amplitude is consistent and its wave edges exhibit smooth, steep transitions. It also provides a degree of filtering. The second signal shaping circuit 73 thus provides the requisite conditioning of the square wave signal prior to passing it to the second level comparator circuit 74.

The second level comparator circuit 74 includes rectifier diode D6, resistor R22, capacitor C15 and inverter 77. Diodes D5 and D7 are employed primarily for clamping the input to the second level comparator circuit 74 for protection. Forming the time constant of a resistance-capacitance circuit, the values of R22 and C15 determine how long the modulated turn signal must be present at the input of the second phase lock loop circuit 71 for the resulting square wave signal to be recognized by the second level comparator circuit 74. If the conditioned modulated turn signal is present at that input for a sufficient amount of time, the second phase lock loop circuit 71 will produce a square wave carrying enough energy to charge up capacitor C15 so that the second level comparator circuit 74 can analyze the amplitude of square wave signal.

Whereas the second phase lock loop circuit 71 checks whether the frequency of the turn modulation signal is too high, the second level comparator circuit 74 checks whether it is too low. The frequency of the modulation signal must then lie between an upper limit set by the second phase lock loop circuit 71 and a lower limit set by the second level comparator circuit 74. As to the lower limit, diode D6 rectifies the incoming square wave signal so as to form a reference dc level therefrom for input into the inverter 77. The reference dc level, of course, is a voltage representation of the frequency of the turn modulation signal carried by the conditioned modulated turn signal. If the reference dc level carries sufficient energy to charge capacitor C15 and overcome the built in threshold of inverter 77, then the frequency of the turn modulation signal represented by that reference level is high enough to warrant activation of the output stage 9.

It is primarily through the second phase lock loop circuit 71 and the second level comparator circuit 74 that a valid incoming turn signal is distinguished from spurious noise including intermittent signals received from transmitters of other, far more remote trolley vehicles. Prior art radio boards have proven vulnerable to such intermittent signals as evidence by false tripping of the frog turn solenoids as noted in the background. The design of the signal processing unit 2, however, overcomes this problem.

Returning to the operation of the turn signal demodulation stage 7, when a reference dc level of sufficiently high strength is received, inverter 77 outputs a low logic signal. This low logic signal indicates that a valid modulated turn signal has been received and processed by the turn signal demodulation stage 7. Inverter 77 somewhat amplifies the low logic signal before passing it to the output stage 9 and also drives one of two light emitted diodes (LEDs) or like visual indicators. Exactly which LED is driven depends on the setting of switch SW1 as described previously. If SW1 is set in the left position, then the left LED 78 is illuminated. If SW1 is set in the right position, then the right LED 79 will be illuminated.

Figure 2E:
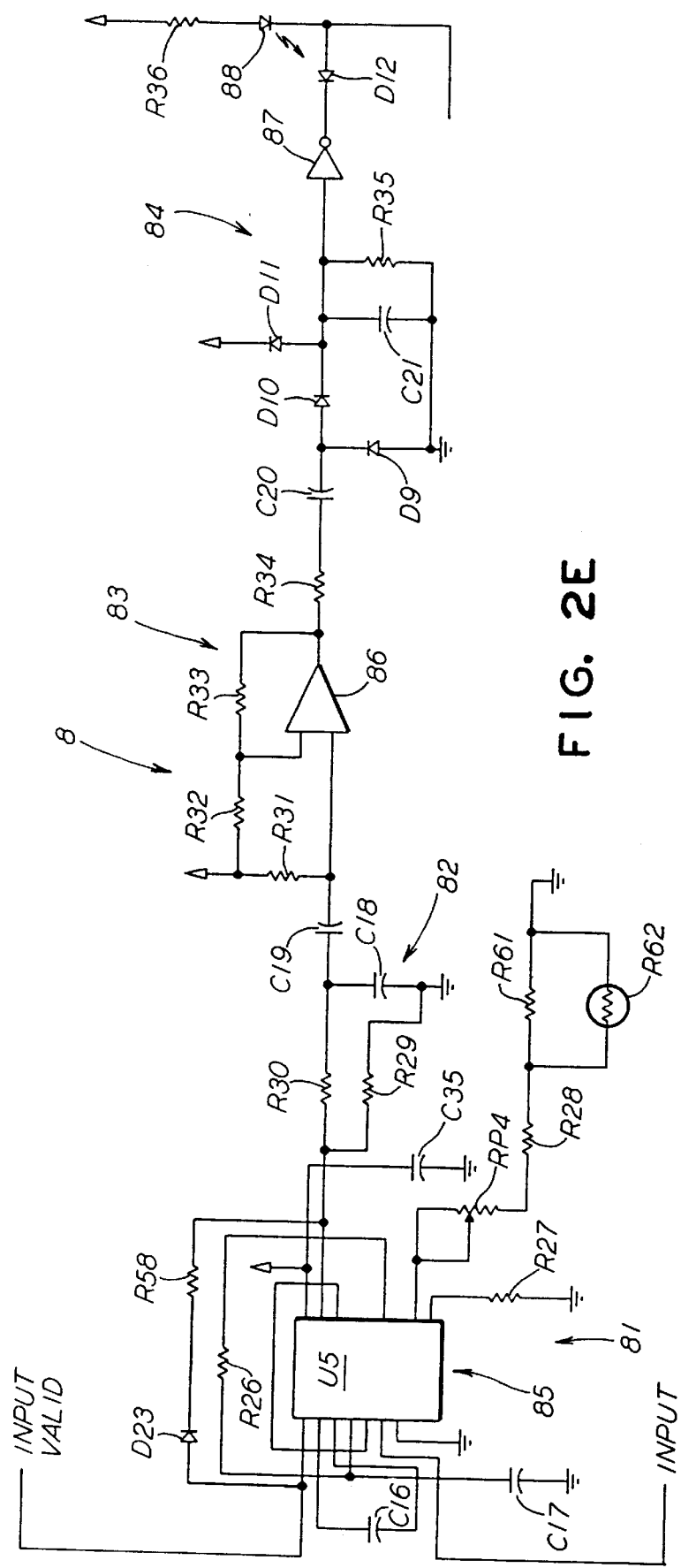
FIG. 2E is a schematic of a straight signal demodulation stage of the signal processing unit according to the present invention.

Consider now the straight signal demodulation stage 8 illustrated in FIGS. 1E and 2E. The straight signal demodulation stage 8 includes a third phase lock loop circuit 81, a third low pass filter circuit 82, a third signal shaping circuit 83, and a third level comparator circuit 84. Setup as a demodulator, the third phase lock loop circuit 81 includes a PLL chip or like circuitry 85 and variable resistor RP4. The straight signal demodulation stage 8 will detect a conditioned modulated straight signal whose frequency may vary up to approximately 400 Hz above or below a resting frequency of 11.5 kHz depending upon the straight modulation signal carried thereby. As with variable resistors RP2 and RP3 of the turn signal demodulation stage 7, variable resistor RP4 allows a field technician to adjust the center frequency detectable by the third phase lock loop circuit 81 to accommodate the particular environmental conditions encountered in the field.

Regarding the operation of the third phase lock loop circuit 81, the third phase lock loop circuit 81 receives both the conditioned modulated straight signal from the signal input stage 5 and the validation signal from the frequency detection stage 6. In response to these inputs, the third phase lock loop circuit 81 outputs a square wave signal whose frequency is that of the straight modulation signal carried by the conditioned modulated straight signal and whose amplitude represents variations of the straight modulation signal. The third phase lock loop circuit 81 will not capture the straight modulation signal carried by the conditioned modulated straight signal if the frequency of the straight modulation signal is too high. Specifically, a straight modulation signal exceeding approximately 400 Hz will not be captured. This corresponds to the preset range of frequencies for a conditioned modulated straight signal of 11.1 kHz to 11.95 kHz.

Accompanying the conditioned modulated straight signal from the signal input stage 5, however, is the aforementioned spurious noise. The square wave that emerges from the third phase lock loop circuit 81 thus passes through the third low pass filter circuit 82. Represented primarily by resistor R30 and capacitor C18, the third low pass filter circuit 82 removes unwanted noise from the square wave signal such that frequencies above a preselected frequency are substantially attenuated and frequencies below the preselected frequency are allowed to pass therethrough. This preselected frequency corresponds to the preset range of frequencies for the straight modulation signal. Specifically, the third low pass filter circuit 82 filters unwanted frequencies above approximately 400 Hz.

The filtered square wave signal then passes into the third signal shaping circuit 83 of the straight signal demodulation stage 8. As illustrated in FIG. 2E, the third signal shaping circuit 83 includes capacitors C19 and C20, op amp 86 and resistors R31 through R34. The third signal shaping circuit 83 improves the condition of the filtered square wave signal so that its amplitude is consistent and its wave edges exhibit smooth, steep transitions. It also provides a degree of filtering. The third signal shaping circuit 83 thus provides the requisite conditioning of the square wave signal prior to passing it to the third level comparator circuit 84.

The third level comparator circuit 84 includes rectifier diode D10, resistor R35, capacitor C21 and inverter 87. Diodes D9 and D10 are employed primarily for clamping the input to the third level comparator circuit 84 for protection. Forming the time constant of a resistance-capacitance circuit, the values of R35 and C21 determine how long the modulated straight signal must be present at the input of the third phase lock loop circuit 81 for the resulting square wave signal to be recognized by the third level comparator circuit 84. If the conditioned modulated straight signal is present at that input for a sufficient amount of time, the third phase lock loop circuit 81 will produce a square wave carrying enough energy to charge up capacitor C21 so that the third level comparator circuit 84 can analyze the amplitude of square wave signal.

Whereas the third phase lock loop circuit 81 checks whether the frequency of the straight modulation signal is too high, the third level comparator circuit 84 checks whether it is too low. The frequency of the straight modulation signal must then lie between an upper limit set by the third phase lock loop circuit 81 and a lower limit set by the third level comparator circuit 84. As to the lower limit, diode D10 rectifies the incoming square wave signal so as to form a reference dc level therefrom for input into the inverter 87. The reference dc level, of course, is a voltage representation of the frequency of the straight modulation signal carried by the conditioned modulated straight signal. If the reference dc level carries sufficient energy to charge capacitor C21 and overcome the built in threshold of inverter 87, then the frequency of the straight modulation signal represented by that reference level is high enough to warrant activation of the output stage 9.

It is primarily through the third phase lock loop circuit 81 and the third level comparator circuit 84 that a valid incoming straight signal is distinguished from spurious noise including intermittent signals received from transmitters of other, far more remote trolley vehicles. Prior art radio boards have proven vulnerable to such intermittent signals as evidence by false tripping of the frog straight solenoids as noted in the background. The design of the signal processing unit 2, however, overcomes this problem.

Returning to the operation of the straight signal demodulation stage 8, when a reference dc level of sufficiently high strength is received, inverter 87 outputs a low logic signal. This low logic signal indicates that a valid modulated straight signal has been received and processed by the straight signal demodulation stage 8. Inverter 87 somewhat amplifies the low logic signal before passing it to the output stage. Inverter 87 also drives an LED or like visual indicator 88 as it outputs the low logic signal.

Figure 2F:
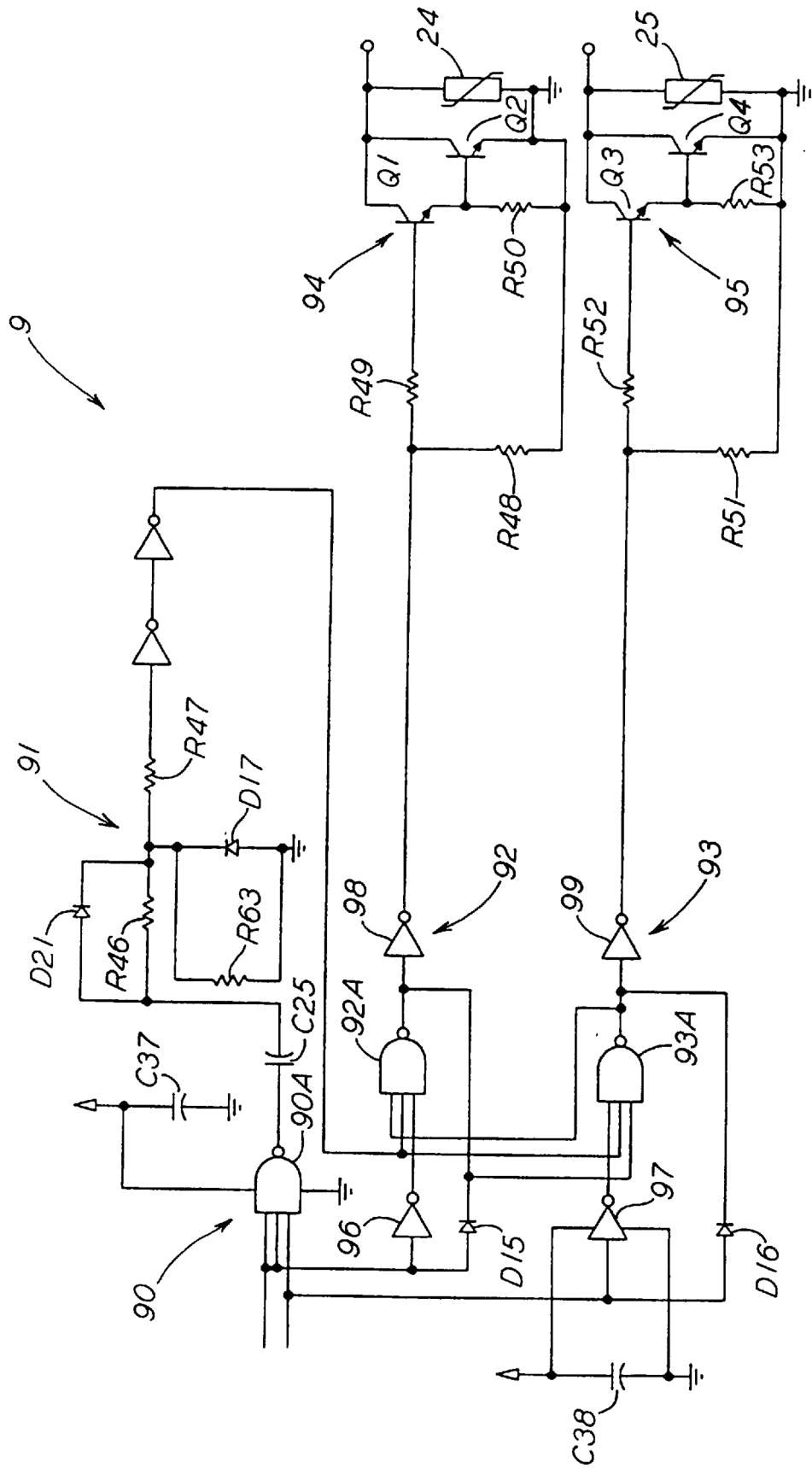
FIG. 2F is a schematic of an output stage of the signal processing unit according to the present invention.

Referring to FIGS. 1F and 2F, the output stage 9 includes a pulse generator circuit 91, logic circuitry, a turn driver circuit 94 and a straight driver circuit 95. The logic circuitry includes an input logic circuit 90 inclusive of NAND gate 90A, a turn logic circuit 92 inclusive of NAND gate 92A and a straight logic circuit 93 inclusive of NAND gate 93A. The input logic circuit 90 is located at the input of the output stage 9 and connects to both of the turn signal and straight signal demodulation stages 7 and 8. Each of the turn and straight logic circuits 92 and 93 also connect to both of the demodulation stages. Specifically, the turn logic circuit 92 receives the output of the turn signal demodulation stage 7 through an inverter 96 and the output of the straight signal demodulation stage 8. Similarly, the straight logic circuit 93 receives the output of the straight signal demodulation stage 8 through another inverter 97 and the output of the turn signal demodulation stage 7. The turn logic circuit 92 feeds into the turn driver circuit 94, and the straight logic circuit 93 feeds into the straight driver circuit 95. The pulse generator circuit 91 feeds into both of the turn and straight logic circuits 92 and 93.

The operation of the output stage 9 depends upon whether it receives a low logic signal from the turn signal demodulation stage 7 or from the straight signal demodulation stage 8. Simply stated, when a low logic signal is received from the turn signal demodulation stage 7, the output stage 9 outputs an intermediate turn command signal from the turn driver circuit 94. Likewise, when a low logic signal is received from the straight signal demodulation stage 8, the output stage 9 outputs an intermediate straight command signal from the straight driver circuit 95. Each of these intermediate command signals takes the form of a pulse of adjustable duration.

Regarding the logic circuitry, the NAND gate 90A of the input logic circuit 90 outputs a high logic signal if either of the logic signals received from the turn signal or straight signal demodulation stages 7 and 8 is low. This inverted logic signal passes to the pulse generator circuit 91 which in response generates the high level pulse of adjustable duration. The logic of the turn and straight logic circuits 92 and 93 assures that if a low logic signal is received from either of the demodulation stages and a pulse is simultaneously received from the pulse generator circuit 91, then the pulse signal passes through one of the inverters 96 or 97 so that a positive going pulse passes to the corresponding one of the turn or straight driver circuits 94 and 95.

Referring in more detail to the operation of the output stage 9 in response to a valid frequency modulated turn signal, the turn signal demodulation stage 7 outputs a low logic signal to the input logic circuit 90, i.e., NAND gate 90A, of the output stage 9. When the low logic signal is received, the input logic circuit 90 processes it through to the pulse generator circuit 91 and to both of the turn and straight logic circuits 92 and 93. The pulse generator circuit 91 then activates for an adjustable duration to produce the pulse, which is also fed into the turn and straight logic circuits 92 and 93.

The adjustable duration for which the pulse generator circuit 91 activates depends on the values of capacitor C25 and resistor R46 as is apparent from FIG. 2F. Preferably, the duration is preset at 500 ms.

The pulse generator circuit 91 also serves as a time out circuit that assures that a frog solenoid will not be energized continuously in the event that an incoming signal is continuously received from a trolley vehicle transmitter. As is apparent, the pulse generator circuit 91 will issue just one pulse of adjustable duration each time a valid incoming signal is received by signal processing unit 2. Through its RC time constant, the pulse generator circuit 91 cannot generate another pulse until the incoming signal has ceased and the time set by the RC time constant has expired.

As is also apparent from FIG. 2F the turn and straight logic circuits 92 and 93 of output stage 9 are configured so as to form a lock out circuit which permits only one of the driver circuits to operate at any given time. Specifically, the output of NAND gate 92A of the turn logic circuit 92 feeds back into the input of NAND gate 93A of the straight logic circuit 93 and vice versa. Consequently, when the turn logic circuit 92 activates the straight logic circuit 93 is disabled. Conversely, when the straight logic circuit 93 activates the turn logic circuit 92 is disabled.

Returning to the operation of the output stage 9 in response to a valid frequency modulated turn signal, the turn logic circuit 92 receives both the low logic signal through inverter 96 from the turn signal demodulation stage 7 and the pulse of adjustable duration from the pulse generator circuit 91. The NAND gate 92A of the turn logic circuit 92 activates in response to these two inputs for the adjustable duration thereby disabling the straight logic circuit 93 through the lock out circuit. Through inverter 98, the turn logic circuit 92 then passes a positive going pulse of adjustable duration to the turn driver circuit 94. When the positive going pulse arrives at the turn driver circuit 94, the turn driver circuit 94 energizes thereby providing a return circuit for driver transistors Q1 and Q2 of the turn driver circuit 94.

Whether the turn signal demodulation stage is set through SW1 to recognize right turn signals or left turn signals, the operation of the output stage remains the same.

Referring in more detail to the operation of the output stage 9 in response to a valid frequency modulated straight signal, the straight signal demodulation stage 8 outputs a low logic signal to the NAND gate 93A of the input logic circuit 90 of the output stage 9. When the low logic signal is received, the input logic circuit 90 processes it through to the pulse generator circuit 91 and to both of the turn and straight logic circuits 92 and 93. The pulse generator circuit 91 then activates for the adjustable duration as set forth previously to produce the pulse which passes to the turn and straight logic circuits 92 and 93.

Analogous to the operation of the turn logic circuit 92, the straight logic circuit 93 thus receives both the low logic signal through inverter 97 from the straight signal demodulation stage 8 and the pulse of adjustable duration from the pulse generator circuit 91. The NAND gate 93A of the straight logic circuit 93 activates in response to these two inputs for the adjustable duration thereby disabling the turn logic circuit 92 through the lock out circuit. Through inverter 99, the straight logic circuit 93 then passes a positive going pulse of adjustable duration to the straight driver circuit 95. When the positive going pulse arrives at the straight driver circuit 95, the straight driver circuit 95 energizes thereby providing a return circuit for driver transistors Q3 and Q4 of the straight driver circuit 95.

Regarding the preferred embodiment of the instant invention, the signal processing unit 2, through its voltage conversion stage 4, as shown in FIG. 2A, receives the 24 volts dc voltage from the power supply circuitry of the prior art controller unit. Reducing this voltage level to 15 volts dc to power its operations, the signal processing unit 2 directly controls the operation of the two high voltage mechanical relays (not shown) described previously. Controlled by the straight driver circuit 94 of the output stage 9, the straight high voltage relay is used to switch trolley line voltage directly to the straight solenoid of the trolley pole switch.

Likewise, controlled by the turn driver circuit 95, the turn high voltage relay is used to switch such voltage directly to the turn solenoid of the trolley pole switch. The coil of straight relay connects between the high voltage trolley line and the collectors of driver transistors Q3 and Q4 of the straight driver circuit 95. The coil of the turn relay likewise connects between the high voltage trolley line and the collectors of driver transistors Q1 and Q2 of the turn driver circuit 94. The straight and turn driver circuits 94 and 95 thus provide the return circuit for the coils of the straight and turn high voltage relays, respectively.

When signal processing unit 2 receives a valid frequency modulated straight signal, for example, the straight signal demodulation stage 8 passes a low logic signal to the output stage as described earlier. After the low logic signal is processed through the input logic circuit 90 and the pulse generator circuit 91 as previously described, the straight logic circuit 93 of the output stage 9 then passes the positive going pulse to the straight driver circuit 95. When the positive pulse arrives at the straight driver circuit 95, the driver transistors Q3 and Q4 activate. The straight driver circuit 95 therethrough provides a return circuit for, and thereby energizes, the coil of the straight high voltage relay. The straight relay then switches the trolley line voltage directly to the straight solenoid of the trolley pole switch. It is through this pulse, otherwise referred to as the intermediate straight command signal herein, that signal processing unit 2 controls the straight high voltage relay to supply power to the straight solenoid of the trolley pole switch.

Likewise, when signal processing unit 2 receives a valid frequency modulated turn signal, for example, the turn signal demodulation stage 7 passes a low logic signal to the output stage 9. After the low logic signal is processed through the input logic circuit 90 and the pulse generator circuit 91 as previously described, the turn logic circuit 92 of the output stage 9 then passes the positive going pulse to the turn driver circuit 94. When the positive pulse arrives at the turn driver circuit 94, the driver transistors Q1 and Q2 activate. The turn driver circuit 94 therethrough provides a return circuit for, and thereby energizes, the coil of the turn high voltage relay. The turn relay then switches the trolley line voltage directly to the turn solenoid of the trolley pole switch. It is through this pulse, otherwise referred to as the intermediate turn command signal herein, that signal processing unit 2 controls the turn high voltage relay to supply power to the turn solenoid of the trolley pole switch.

In this preferred embodiment, the signal processing unit 2 preferably includes overvoltage protection circuitry. Because the turn and straight high voltage mechanical relays when actuated directly pass the high voltage of the trolley line to the appropriate frog solenoids, the turn and straight driver circuits 94 and 95 of signal processing unit 2 would each be subject to surge voltages arising on the trolley line. Although any one of a variety of surge arrestors may suffice, the overvoltage protection circuitry preferably may take the form of metal oxide varistor (MOVs). Positioned collector to emitter across the driver transistor Q4 of the straight driver circuit 95 and the driver transistor Q2 of the turn driver circuit 94 as shown in FIG. 2F, the MOVs 24 and 25 protect the driver circuits 94 and 95, respectively, from surge voltages that may arise on the trolley line.

As noted in the background, the present invention in a second embodiment may be also be used as a replacement for a signal processing unit described and claimed in the aforementioned application entitled Electronic Controller For A Trolley Pole Switch Mechanism. The signal processing unit therein is employed in tandem with a power controlling unit to control the frog solenoids of a trolley pole switch without the need for mechanical relays or the power supply circuitry 301. When used with the instant invention 2, the power controlling unit supplies the input voltage of 24 volts dc to the voltage conversion stage 4 of signal processing unit 2. The power controlling unit also continuously supplies a primary voltage level, i.e., a 12 volt dc reference voltage, to the collectors of driver transistors Q1 and Q2 of the turn driver circuit 94. The power controlling unit likewise supplies a 12 volt dc reference voltage to the collectors of driver transistors Q3 and Q4 of the straight driver circuit 95.

When the instant invention 2 receives a valid frequency modulated straight signal, the straight signal demodulation stage 8 passes a low logic signal to the output stage 9 as described earlier. After the low logic signal is processed through the input logic circuit 90 and the pulse generator circuit 91 as previously described, the straight logic circuit 93 of the output stage then passes the positive going pulse to the straight driver circuit 95. When the positive going pulse arrives at the straight driver circuit 95, the straight driver circuit 95 energizes thereby providing a return circuit for driver transistors Q3 and Q4. The straight driver circuit 95 therethrough passes a negative going 12 volt dc pulse to the corresponding input of the power controlling unit. It is through this negative pulse, otherwise referred to as the intermediate straight command signal herein, that the instant invention 2 commands the power controlling unit to supply power to the straight solenoid of the trolley pole switch.

Likewise, when the instant invention 2 receives a valid frequency modulated turn signal, the turn signal demodulation stage 7 passes a low logic signal to the output stage 9. After the low logic signal is processed through the input logic circuit 90 and the pulse generator circuit 91 as previously described, the turn logic circuit 92 of the output stage 93 then passes the positive going pulse to the turn driver circuit 94. When the positive going pulse arrives at the turn driver circuit 94, the turn driver circuit 94 energizes thereby providing a return circuit for driver transistors Q1 and Q2. The turn driver circuit 94 therethrough passes a negative going 12 volt dc pulse to the corresponding input of the power controlling unit. It is through this negative pulse, otherwise referred to as the intermediate turn command signal herein, that the instant invention 2 commands the power controlling unit to supply power to turn solenoid of the trolley pole switch.

For this second embodiment of the instant invention 2, the overvoltage protection circuitry need not, of course, be employed. This is because its intermediate command signals would be used to drive circuitry of the power controlling unit which operates at low voltages, thereby obviating the need for such surge protection.

While the presently preferred and second embodiments for carrying out the instant invention have been set forth in detail according to the Patent Act, those persons of ordinary skill in the technical art to which this invention pertains will recognize various alternative ways of practicing the invention without departing from the spirit and scope of the appended claims. Those of ordinary skill will also recognize that the foregoing description is merely illustrative and is not intended to limit the invention in any way.

Accordingly, to promote the progress of science and useful arts, we secure for ourselves by Letters Patent exclusive rights to all subject matter embraced by the following claims for the time prescribed by the Patent Act.

We claim:

1. A signal processing unit for a controller of a trolley pole switch, such trolley pole switch having at least one frog for switching the path of travel therethrough of an energy collector assembly of a trolley pole at a junction of power conduits at which a turn power conduit and a straight power conduit diverge from such straight power conduit, said signal processing unit comprising:

(a) an input means for filtering, amplifying and conditioning each of a plurality of modulated signals, each of such modulated signals being indicative of a request to switch the path of travel of such energy collector assembly through such trolley pole switch to a desired one of such power conduits diverging therefrom, and for generating in response to each such modulated signal a conditioned modulated signal, said conditioned modulated signal being a conditioned modulated turn signal when generated in response to one of such modulated signals indicative of a request to switch the path of travel to such turn power conduit and being a conditioned modulated straight signal when generated in response to one of such modulated signals indicative of a request to switch the path of travel to such straight power conduit;

(b) a frequency detection means for detecting whether said conditioned modulated signal received from said input means falls within a predetermined band of frequencies and, if so, generating in response to said conditioned modulated signal so received a validation signal indicative of same;

(c) a turn signal demodulation means for receiving said conditioned modulated turn signal from said input means and said validation signal from said frequency detection means such that if said conditioned modulated turn signal and said validation signal are received simultaneously, said turn signal demodulation means demodulates said conditioned modulated turn signal and generates in response thereto a low logic signal;

(d) a straight signal demodulation means for receiving said conditioned modulated straight signal from said input means and said validation signal from said frequency detection means such that if said conditioned modulated straight signal and said validation signal are received simultaneously, said straight signal demodulation means demodulates said conditioned modulated straight signal and generates in response thereto a low logic signal; and (e) an output means for receiving said low logic signals from said turn signal and said straight signal demodulation means such that (i) if said low logic signal is received from said turn signal demodulation means, said output means generates an intermediate turn command signal for energizing a coil of a turn relay of such controller so as to supply power to one electrical operator of such at least one frog for effecting the switch in the path of travel to such turn power conduit and (ii) if said low logic signal is received from said straight signal demodulation means, said output means generates an intermediate straight command signal for energizing a coil of a straight relay of such controller so as to supply power to another electrical operator of such at least one frog for effecting the switch in the path of travel to such straight power conduit, wherein said output means disables itself from generating said intermediate command signals simultaneously.

2. The signal processing unit as recited in claim 1 wherein said input means includes:

(a) a bandpass filter circuit for filtering each such modulated signal so received such that frequencies outside said predetermined band are substantially attenuated and frequencies within said predetermined band are allowed to pass therethrough as a filtered modulated signal indicative of such request;

(b) an isolation circuit, through which said filtered modulated signal passes, for substantially isolating electrically said signal processing unit from undesired electrical influences;

(c) a gain adjusting circuit, through which said filtered modulated signal passes from said isolation circuit, for adjusting sensitivity of said input means to such modulated signal so received;

(d) a bandpass amplifier circuit for amplifying said filtered modulated signal received from said gain adjuster circuit such that frequencies within said predetermined band are allowed to pass through said bandpass amplifier with substantially uniform response as an amplified modulated signal; and (e) a first signal shaping circuit, through which said amplified modulated signal passes from said bandpass amplifier circuit, for improving condition of the waveform of said amplified modulated signal so as to form said conditioned modulated signal for further processing by said signal processing unit.

3. The signal processing unit as recited in claim 2 wherein said frequency detection means includes:

(a) a first phased locked loop circuit for receiving said conditioned modulated signal from said first signal shaping circuit and generating in response thereto a square wave signal whose voltage level is representative of the frequency of said conditioned modulated signal; and (b) a first level comparator circuit for setting upper and lower voltage thresholds and for comparing said voltage level of said square wave signal such that if said voltage level of said square wave signal falls within said voltage thresholds said first level comparator circuit generates said validation signal.

4. The signal processing unit as recited in claim 3 wherein said turn signal demodulation means includes:

(a) a second phase lock loop circuit for receiving said conditioned modulated turn signal from said first signal shaping circuit and said validation signal from said first level comparator circuit such that if said conditioned modulated turn signal and said validation signal are received simultaneously, said second phase lock loop circuit demodulates said conditioned modulated turn signal and generates in response thereto a square wave turn signal whose voltage level is representative of the frequency of a modulation turn signal carried by said conditioned modulated turn signal;

(b) a second low pass filter circuit for filtering noise from said square wave turn signal such that frequencies above a first preselected frequency corresponding to such modulation turn signal are substantially attenuated and frequencies below said first preselected frequency are allowed to pass therethrough;

(c) a second signal shaping circuit, through which said square wave turn signal passes from said second low pass filter circuit, for improving condition of the waveform of said square wave turn signal for further processing by said turn signal demodulation means; and (d) a second level comparator circuit for setting a lower voltage threshold and for comparing said voltage level of said square wave turn signal such that if said voltage level of said square wave turn signal lies above said lower voltage threshold said second level comparator circuit generates said low logic signal.

5. The signal processing unit as recited in claim 4 wherein said straight signal demodulation means includes:

(a) a third phase lock loop circuit for receiving said conditioned modulated straight signal from said first signal shaping circuit and said validation signal from said first level comparator circuit such that if said conditioned modulated straight signal and said validation signal are received simultaneously, said third phase lock loop circuit demodulates said conditioned modulated straight signal and generates in response thereto a square wave straight signal whose voltage level is representative of the frequency of a modulation straight signal carried by said conditioned modulated straight signal;

(b) a third low pass filter circuit for filtering noise from said square wave straight signal such that frequencies above a first preselected frequency corresponding to such modulation straight signal are substantially attenuated and frequencies below said first preselected frequency are allowed to pass therethrough;

(c) a third signal shaping circuit, through which said square wave turn signal passes from said third low pass filter circuit, for improving condition of the waveform of said square wave turn signal for further processing by said straight signal demodulation means; and (d) a third level comparator circuit for setting a lower voltage threshold and for comparing said voltage level of said square wave turn signal such that if said voltage level of said square wave turn signal lies above said lower voltage threshold said third level comparator circuit generates said low logic signal.

6. The signal processing unit as recited in claim 5 wherein said output means includes:

(a) an input logic circuit for receiving said low logic signal from said second level comparator circuit and said low logic signal from said third level comparator circuit and for generating in response to either a high logic signal;

(b) a pulse generator circuit for receiving said high logic signal from said input logic circuit and for generating in response thereto a high pulse of adjustable duration;

(c) a turn logic circuit connected to said pulse generator circuit and said second level comparator circuit such that said turn logic circuit activates upon receiving both said pulse and said low logic signal thereby generating in response thereto a positive going pulse;

(d) a straight logic circuit connected to said pulse generator circuit and said third level comparator circuit such that said straight logic circuit activates upon receiving both said pulse and said low logic signal thereby generating in response thereto a positive going pulse;

(e) a turn driver circuit connected to said turn logic circuit such that said turn driver circuit energizes upon receiving said positive going pulse from said turn logic circuit thereby generating in response thereto a negative going pulse constituting said intermediate turn command signal; and (f) a straight driver circuit connected to said straight logic circuit such that said straight driver circuit energizes upon receiving said positive going pulse from said straight logic circuit thereby generating in response thereto a negative going pulse constituting said intermediate straight command signal.

7. The signal processing unit as recited in claim 6 wherein said turn logic circuit and said straight logic circuit are configured to form a lock out circuit through which activation of one of said logic circuits automatically disables the other of said logic circuits thereby preventing both of said driver circuits from being simultaneously energized so as to prevent both of said intermediate command signals from being generated simultaneously.

8. The signal processing unit as recited in claim 6 wherein each of said driver circuits include surge protection circuitry.

9. The signal processing unit as recited in claim 8 wherein said surge protection circuitry consists essentially of a metal oxide varistor device positioned across each of said driver circuits.

10. The signal processing unit as recited in claim 1 further including a voltage conversion means for receiving and regulating power received from a power supply circuit contained within such controller of such trolley pole switch for operation of said signal processing unit.

11. The signal processing unit as recited in claim 1 wherein said output means includes a time out circuit such that said intermediate turn command signal and said intermediate straight command signal are each of an adjustable duration in response to said low logic signals received from said turn signal and said straight signal demodulation stages, respectively.

12. A signal processing unit for a controller of a trolley pole switch, such trolley pole switch having at least one frog for switching the path of travel therethrough of an energy collector assembly of a trolley pole at a junction of power conduits at which a turn power conduit and a straight power conduit diverge from such straight power conduit, said signal processing unit comprising:

(a) an input means for filtering, amplifying and conditioning each of a plurality of modulated signals each of which indicative of a request to switch the path of travel of such energy collector assembly through such trolley pole switch to a desired one of such power conduits diverging therefrom and for generating in response to each such modulated signal a conditioned modulated signal, said conditioned modulated signal being a conditioned modulated turn signal when generated in response to one of such modulated signals indicative of a request to switch the path of travel to such turn power conduit and being a conditioned modulated straight signal when generated in response to one of such modulated signals indicative of a request to switch the path of travel to such straight power conduit;

(b) a frequency detection means for generating a validation signal when said conditioned modulated signal received from said input means falls within a predetermined band of frequencies;

(c) a turn signal demodulation means, connected to said input means and said frequency detection means, for generating a low logic signal when said conditioned modulated turn signal and said validation signal are received simultaneously by said turn signal demodulation means;

(d) a straight signal demodulation means, connected to said input means and said frequency detection means, for generating a low logic signal when said conditioned modulated straight signal and said validation signal are received simultaneously by said straight signal demodulation means; and (e) an output means, connected to said turn signal and said straight signal demodulation means, for generating (i) an intermediate turn command signal when said low logic signal is received from said turn signal demodulation means such that said intermediate turn command signal actuates a turn relay of such controller through which power is supplied to one electrical operator of such at least one frog for effecting the switch in the path of travel to such turn power conduit and (ii) an intermediate straight command signal when said low logic signal is received from said straight signal demodulation means such that said intermediate straight command signal actuates a straight relay of such controller through which power is supplied to another electrical operator of such at least one frog for effecting the switch in the path of travel to such straight power conduit, wherein said output means disables itself from generating said intermediate command signals simultaneously.

13. The signal processing unit as recited in claim 12 wherein said input means includes:
(a) a bandpass filter circuit for filtering each such modulated signal so received such that frequencies outside said predetermined band are substantially attenuated and frequencies within said predetermined band are allowed to pass therethrough as a filtered modulated signal indicative of such request;
(b) an isolation circuit, through which said filtered modulated signal passes, for substantially isolating electrically said signal processing unit from undesired electrical influences;
(c) a gain adjusting circuit, through which said filtered modulated signal passes from said isolation circuit, for adjusting sensitivity of said input means to such modulated signal so received;
(d) a bandpass amplifier circuit for amplifying said filtered modulated signal received from said gain adjuster circuit such that frequencies within said predetermined band are allowed to pass through said bandpass amplifier with substantially uniform response as an amplified modulated signal; and
(e) a first signal shaping circuit, through which said amplified modulated signal passes from said bandpass amplifier circuit, for improving condition of the waveform of said amplified modulated signal so as to form said conditioned modulated signal for further processing by said signal processing unit.

14. The signal processing unit as recited in claim 13 wherein said frequency detection means includes:
(a) a first phased locked loop circuit for receiving said conditioned modulated signal from said first signal shaping circuit and generating in response thereto a square wave signal whose voltage level is representative of the frequency of said conditioned modulated signal; and
(b) a first level comparator circuit for setting upper and lower voltage thresholds and for comparing said voltage level of said square wave signal such that if said voltage level of said square wave signal falls within said voltage thresholds said first level comparator circuit generates said validation signal.

15. The signal processing unit as recited in claim 14 wherein said turn signal demodulation means includes:
(a) a second phase lock loop circuit for receiving said conditioned modulated turn signal from said first signal shaping circuit and said validation signal from said first level comparator circuit such that if said conditioned modulated turn signal and said validation signal are received simultaneously, said second phase lock loop circuit demodulates said conditioned modulated turn signal and generates in response thereto a square wave turn signal whose voltage level is representative of the frequency of a modulation turn signal carried by said conditioned modulated turn signal;
(b) a second low pass filter circuit for filtering noise from said square wave turn signal such that frequencies above a first preselected frequency corresponding to such modulation turn signal are substantially attenuated and frequencies below said first preselected frequency are allowed to pass therethrough;
(c) a second signal shaping circuit, through which said square wave turn signal passes from said second low pass filter circuit, for improving condition of the waveform of said square wave turn signal for further processing by said turn signal demodulation means; and
(d) a second level comparator circuit for setting a lower voltage threshold and for comparing said voltage level of said square wave turn signal such that if said voltage level of said square wave turn signal lies above said lower voltage threshold said second level comparator circuit generates said low logic signal.

16. The signal processing unit as recited in claim 15 wherein said straight signal demodulation means includes:
(a) a third phase lock loop circuit for receiving said conditioned modulated straight signal from said first signal shaping circuit and said validation signal from said first level comparator circuit such that if said conditioned modulated straight signal and said validation signal are received simultaneously, said third phase lock loop circuit demodulates said conditioned modulated straight signal and generates in response thereto a square wave straight signal whose voltage level is representative of the frequency of a modulation straight signal carried by said conditioned modulated straight signal;
(b) a third low pass filter circuit for filtering noise from said square wave straight signal such that frequencies above a first preselected frequency corresponding to such modulation straight signal are substantially attenuated and frequencies below said first preselected frequency are allowed to pass therethrough;
(c) a third signal shaping circuit, through which said square wave turn signal passes from said third low pass filter circuit, for improving condition of the waveform of said square wave turn signal for further processing by said straight signal demodulation means; and
(d) a third level comparator circuit for setting a lower voltage threshold and for comparing said voltage level of said square wave turn signal such that if said voltage level of said square wave turn signal lies above said lower voltage threshold said third level comparator circuit generates said low logic signal.

17. The signal processing unit as recited in claim 16 wherein said output means includes:
(a) an input logic circuit for receiving said low logic signal from said second level comparator circuit and said low logic signal from said third level comparator circuit and for generating in response to either a high logic signal;
(b) a pulse generator circuit for receiving said high logic signal from said input logic circuit and for generating in response thereto a high pulse of adjustable duration;

(c) a turn logic circuit connected to said pulse generator circuit and said second level comparator circuit such that said turn logic circuit activates upon receiving both said pulse and said low logic signal thereby generating in response thereto a positive going pulse;

(d) a straight logic circuit connected to said pulse generator circuit and said third level comparator circuit such that said straight logic circuit activates upon receiving both said pulse and said low logic signal thereby generating in response thereto a positive going pulse;

(e) a turn driver circuit connected to said turn logic circuit such that said turn driver circuit energizes upon receiving said positive going pulse from said turn logic circuit thereby generating in response thereto a negative going pulse constituting said intermediate turn command signal; and (f) a straight driver circuit connected to said straight logic circuit such that said straight driver circuit energizes upon receiving said positive going pulse from said straight logic circuit thereby generating in response thereto a negative going pulse constituting said intermediate straight command signal.

18. The signal processing unit as recited in claim 17 wherein said turn logic circuit and said straight logic circuit are configured to form a lock out circuit through which activation of one of said logic circuits automatically disables the other of said logic circuits thereby preventing both of said driver circuits from being simultaneously energized so as to prevent both of said intermediate command signals from being generated simultaneously.

19. The signal processing unit as recited in claim 18 wherein each of said driver circuits include surge protection circuitry.

20. The signal processing unit as recited in claim 19 wherein said surge protection circuitry consists essentially of a metal oxide varistor device positioned across each of said driver circuits.

21. The signal processing unit as recited in claim 12 further including a voltage conversion means for receiving and regulating power received from a power supply circuit contained within such controller of such trolley pole switch for operation of said signal processing unit.

22. The signal processing unit as recited in claim 12 wherein said output means includes a time out circuit such that said intermediate turn command signal and said intermediate straight command signal are each of an adjustable duration in response to said low logic signals received from said turn signal and said straight signal demodulation stages, respectively.

23. A signal processing unit for a controller of a trolley pole switch, such trolley pole switch having at least one frog for switching the path of travel therethrough of an energy collector assembly of a trolley pole at a junction of power conduits at which a turn power conduit and a straight power conduit diverge from such straight power conduit, said signal processing unit comprising:

(a) an input means for filtering, amplifying and conditioning each of a plurality of modulated signals each of which indicative of a request to switch the path of travel of such energy collector assembly through such trolley pole switch to a desired one of such power conduits diverging therefrom and for generating in response to each such modulated signal a conditioned modulated signal, said conditioned modulated signal being a conditioned modulated turn signal when generated in response to one of such modulated signals indicative of a request to switch the path of travel to such turn power conduit and being a conditioned modulated straight signal when generated in response to one of such modulated signals indicative of a request to switch the path of travel to such straight power conduit;

(b) a frequency detection means for generating a validation signal when said conditioned modulated signal received from said input means falls within a predetermined band of frequencies;

(c) a turn signal demodulation means, connected to said input means and said frequency detection means, for generating a low logic signal when said conditioned modulated turn signal and said validation signal are received simultaneously by said turn signal demodulation means;

(d) a straight signal demodulation means, connected to said input means and said frequency detection means, for generating a low logic signal when said conditioned modulated straight signal and said validation signal are received simultaneously by said straight signal demodulation means; and (e) an output means, connected to said turn signal and said straight signal demodulation means, for generating (i) an intermediate turn command signal when said low logic signal is received from said turn signal demodulation means such that said intermediate turn command signal commands a power controlling unit of such controller to supply power to one electrical operator of such at least one frog for effecting the switch in the path of travel to such turn power conduit and (ii) an intermediate straight command signal when said low logic signal is received from said straight signal demodulation means such that said intermediate straight command signal commands such power controlling unit of such controller to supply power to another electrical operator of such at least one frog for effecting the switch in the path of travel to such straight power conduit, wherein said output means disables itself from generating said intermediate command signals simultaneously.

24. The signal processing unit as recited in claim 23 further including a voltage conversion means for receiving and regulating power received from such power controlling unit for operation of said signal processing unit.

* * * * *